(12) United States Patent
Howe et al.

(10) Patent No.: US 10,432,395 B2
(45) Date of Patent: Oct. 1, 2019

(54) RECIPIENT-DRIVEN DATA ENCRYPTION

(71) Applicant: The Boeing Company, Chicago, IL (US)

(72) Inventors: Wayne R. Howe, Irvine, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 15/724,990

(22) Filed: Oct. 4, 2017

(65) Prior Publication Data

US 2019/0103962 A1    Apr. 4, 2019

(51) Int. Cl.
| | |
|---|---|
| H04L 9/00 | (2006.01) |
| H04L 9/08 | (2006.01) |
| H04B 10/70 | (2013.01) |
| H04L 29/06 | (2006.01) |
| G06F 21/51 | (2013.01) |

(52) U.S. Cl.
CPC ............ *H04L 9/0858* (2013.01); *H04B 10/70* (2013.01); *H04L 63/062* (2013.01); *G06F 21/51* (2013.01)

(58) Field of Classification Search
CPC .................................................... H04L 9/0858
USPC ........................................................ 380/278
See application file for complete search history.

(56) References Cited

U.S. PATENT DOCUMENTS

| | | | |
|---|---|---|---|
| 7,418,737 B2 | 8/2008 | Grupe | |
| 2006/0002563 A1* | 1/2006 | Bussieres | H04L 9/0852 380/278 |
| 2013/0051800 A1* | 2/2013 | Soto Rodriguez | H04L 9/0852 398/65 |
| 2018/0309571 A1 | 10/2018 | Arora | |
| 2019/0097792 A1 | 3/2019 | Howe et al. | |

OTHER PUBLICATIONS

Haitjema, Mart, "A Survey of the Prominent Quantum Key Distribution Protocols," accessed from http://www.cse.wustl.edu/~jain/cse571-07/ftp/guantum/ on Dec. 14, 2017, pp. 1-12.

* cited by examiner

*Primary Examiner* — Longbit Chai
(74) *Attorney, Agent, or Firm* — Kunzler Bean & Adamson

(57) ABSTRACT

A system that includes a quantum key device, a first device, and a second device. A monitor module is configured to detect, at the first device, that the second device is reading quantum information over a second quantum communication channel. A read module is configured to read, at the first device, the quantum information over a first quantum communication channel. An encryption module is configured to generate a first quantum encryption key at the first device using the quantum information that is read over the first quantum communication channel. The encryption module is also configured to encrypt data using the first quantum encryption key to create encrypted data. The second device decrypts the encrypted data using a second quantum encryption key generated at the second device using the quantum information read at the second device to create decrypted data.

20 Claims, 6 Drawing Sheets

RECIPIENT-DRIVEN DATA ENCRYPTION

FIELD

This disclosure relates generally to data encryption, and more particularly to recipient-driven data encryption using quantum key distribution.

BACKGROUND

In conventional cryptography systems, the sender initiates the sharing of sensitive data by encrypting the data and sending it to a recipient. The recipient may then use a shared key or shared secret to decrypt the data. However, the recipient may not be prepared to receive the encrypted data. Furthermore, because shared keys or shared secrets are not changed often when they are used for cryptography, it is easier for hackers to misappropriate the shared keys or shared secrets and compromise the system.

SUMMARY

The subject matter of the present application has been developed in response to the present state of the art, and in particular, in response to the problems and disadvantages associated with conventional data encryption security systems. Accordingly, the subject matter of the present application has been developed to provide a data encryption security system that overcomes at least some of the above-discussed shortcomings of prior art techniques.

Described herein is a system that comprises a quantum key device configured to generate quantum information and transmit the quantum information over a first quantum communication channel and a second quantum communication channel. The system also comprises a first device communicatively coupled to the quantum key device over the first quantum communication channel. The system additionally comprises a second device communicatively coupled to the quantum key device over the second quantum communication channel. The system further comprises a monitor module configured to detect, at the first device, that the second device is reading the quantum information over the second quantum communication channel. The system also comprises a read module configured to read, at the first device, the quantum information over the first quantum communication channel responsive to detecting that the second device is reading the quantum information over the second quantum communication channel. The system additionally comprises an encryption module configured to generate a first quantum encryption key at the first device using the quantum information that is read over the first quantum communication channel. The encryption module is also configured to encrypt data using the first quantum encryption key to create encrypted data. The system further comprises a transmission module configured to transmit the encrypted data to the second device. The second device decrypts the encrypted data using a second quantum encryption key generated at the second device using the quantum information read at the second device to create decrypted data. The first quantum encryption key is the same as the second quantum encryption key. At least a portion of the modules comprise one or more of a hardware circuit, a programmable hardware device, or executable code, the executable code stored on one or more computer readable storage media. The preceding subject matter of this paragraph characterizes example 1 of the present disclosure.

The quantum information comprises a stream of entangled quantum particles such that when a state of a quantum particle of an entangled set of quantum particles is read, corresponding states of other quantum particles in the set of quantum particles are determinable. The preceding subject matter of this paragraph characterizes example 2 of the present disclosure, wherein example 2 also includes the subject matter according to example 1, above.

The monitor module is further configured to detect that the second device is reading the quantum information over the second quantum communication channel by detecting, at the first device, that the quantum particles of the quantum information transmitted over the first quantum communication channel are disentangled from corresponding quantum particles read at the second device over the second quantum communication channel. The preceding subject matter of this paragraph characterizes example 3 of the present disclosure, wherein example 3 also includes the subject matter according to example 2, above.

The monitor module compares at least a portion of quantum information received at the first device over the first quantum communication channel and at the second device over the second quantum communication channel to determine whether the quantum information read at the first device correlates to the quantum information read at the second device, a positive correlation indicating that the second device is reading quantum information over the second quantum communication channel. The preceding subject matter of this paragraph characterizes example 4 of the present disclosure, wherein example 4 also includes the subject matter according to example 3, above.

The quantum key device continuously sends quantum information over the first and second quantum communication channels. The first and second devices read quantum information from the first and second quantum communication channels each time a quantum encryption key is generated. The preceding subject matter of this paragraph characterizes example 5 of the present disclosure, wherein example 5 also includes the subject matter according to any one of examples 1-4, above.

The read module reads quantum information read over the first quantum communication channel until the second device stops reading corresponding quantum information over the second quantum communication channel. The preceding subject matter of this paragraph characterizes example 6 of the present disclosure, wherein example 6 also includes the subject matter according to any one of examples 1-5, above.

The transmission module transmits the encrypted data over a standard communication channel that is separate from the first and second quantum communication channels. The preceding subject matter of this paragraph characterizes example 7 of the present disclosure, wherein example 7 also includes the subject matter according to any one of examples 1-6, above.

The encryption module generates a new first quantum encryption key derived from the quantum information transmitted over the first quantum communication channel for each new data intended for the second device. The preceding subject matter of this paragraph characterizes example 8 of the present disclosure, wherein example 8 also includes the subject matter according to any one of examples 1-7, above.

The system further comprises a termination module configured to prevent access to the first and second quantum encryption keys after the first and second quantum encryption keys are used to encrypt and decrypt the data on the first and second devices, respectively. The termination module prevents access by one of: deleting the first and second quantum encryption keys or overwriting the first and second quantum encryption keys. The preceding subject matter of this paragraph characterizes example 9 of the present disclosure, wherein example 9 also includes the subject matter according to any one of examples 1-8, above.

The system further comprises a notification module configured to notify the second device that data at the first device is waiting to be transmitted to the second device. The preceding subject matter of this paragraph characterizes example 10 of the present disclosure, wherein example 10 also includes the subject matter according to any one of examples 1-9, above.

The system further comprises an error module configured to detect an error in the quantum information transmitted over one of the first and second quantum communication channels. The error indicates that quantum information transmitted over one of the first and second quantum communication channels has been misappropriated. The preceding subject matter of this paragraph characterizes example 11 of the present disclosure, wherein example 11 also includes the subject matter according to any one of examples 1-10, above.

The error module detects an error in the quantum information received at one of the first and second devices over the first and second quantum communication channels by comparing at least a portion of the first and second quantum encryption keys. The preceding subject matter of this paragraph characterizes example 12 of the present disclosure, wherein example 12 also includes the subject matter according to example 11, above.

Further described herein is an apparatus that comprises a monitor module configured to detect, at a first device, that a second device is reading quantum information over a second quantum communication channel. The quantum information is received from a quantum key device communicatively coupled to the second device over the second quantum communication channel. The apparatus also comprises a read module configured to read, at the first device, quantum information over a first quantum communication channel responsive to detecting that the second device is reading the quantum information over the second quantum communication channel. The first device is communicatively coupled to the quantum key device over the first quantum communication channel. The apparatus additionally comprises an encryption module configured to generate a first quantum encryption key at the first device using the quantum information that is read over the first quantum communication channel. The encryption module is also configured to encrypt data using the first quantum encryption key to create encrypted data. The apparatus further comprises a transmission module configured to transmit the encrypted data to the second device. The second device decrypts the encrypted data using a second quantum encryption key generated at the second device using the quantum information read at the second device to create decrypted data. The first quantum encryption key is the same as the second quantum encryption key. The preceding subject matter of this paragraph characterizes example 13 of the present disclosure.

The quantum information comprises a stream of entangled quantum particles such that when a state of a quantum particle of an entangled set of quantum particles is read, corresponding states of other quantum particles in the entangled set of quantum particles are determinable. The preceding subject matter of this paragraph characterizes example 14 of the present disclosure, wherein example 14 also includes the subject matter according to example 13, above.

The monitor module is further configured to detect that the second device is reading the quantum information over the second quantum communication channel by detecting, at the first device, that the quantum particles of the quantum information transmitted over the first quantum communication channel are disentangled from corresponding quantum particles read at the second device over the second quantum communication channel. The preceding subject matter of this paragraph characterizes example 15 of the present disclosure, wherein example 15 also includes the subject matter according to example 14, above.

The monitor module compares at least a portion of quantum information received at the first device over the first quantum communication channel and at the second device over the second quantum communication channel to determine whether the quantum information read at the first device correlates to the quantum information read at the second device. A positive correlation indicates that the second device is reading quantum information over the second quantum communication channel. The preceding subject matter of this paragraph characterizes example 16 of the present disclosure, wherein example 16 also includes the subject matter according to example 15, above.

The quantum key device continuously sends quantum information over the first and second quantum communication channels. The first and second devices reading quantum information from the first and second quantum communication channels each time a quantum encryption key is generated. The preceding subject matter of this paragraph characterizes example 17 of the present disclosure, wherein example 17 also includes the subject matter according to any one of examples 13-16, above.

The read module reads quantum information read over the first quantum communication channel until the second device stops reading corresponding quantum information over the second quantum communication channel. The preceding subject matter of this paragraph characterizes example 18 of the present disclosure, wherein example 18 also includes the subject matter according to any one of examples 13-17, above.

The apparatus further comprises a termination module configured to prevent access to the first and second quantum encryption keys after the first and second quantum encryption keys are used to encrypt and decrypt the data on the first and second devices, respectively. The termination module prevents access by one of: deleting the first and second quantum encryption keys or overwriting the first and second quantum encryption keys. The preceding subject matter of this paragraph characterizes example 19 of the present disclosure, wherein example 19 also includes the subject matter according to any one of examples 13-18, above.

Additionally, described herein is a method that comprises detecting, at a first device, that a second device is reading quantum information over a second quantum communication channel. The quantum information received from a quantum key device communicatively coupled to the second device over the second quantum communication channel. The method also comprises reading, at the first device, quantum information over a first quantum communication channel responsive to detecting that the second device is reading the quantum information over the second quantum communication channel. The first device is communicatively coupled to the quantum key device over the first quantum communication channel. The method further comprises generating a first quantum encryption key at the first device using the quantum information that is read over the first quantum communication channel. The method additionally comprises encrypting data using the first quantum encryption key to create encrypted data. The method also comprises transmitting the encrypted data to the second device. The second device decrypts the encrypted data using a second quantum encryption key generated at the second device using the quantum information read at the second device to create decrypted data. The first quantum encryption key is the same as the second quantum encryption key. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Some embodiments of the present disclosure provide quantum-based data encryption systems that utilize quantum computing and quantum data to generate the same encryption keys at different devices using quantum information received over quantum communication channels, detect eavesdroppers on the quantum communication channels, encrypt and decrypt data using the encryption keys, and securely prevent access to the decrypted data after a predetermined period of time.

Figure 1:
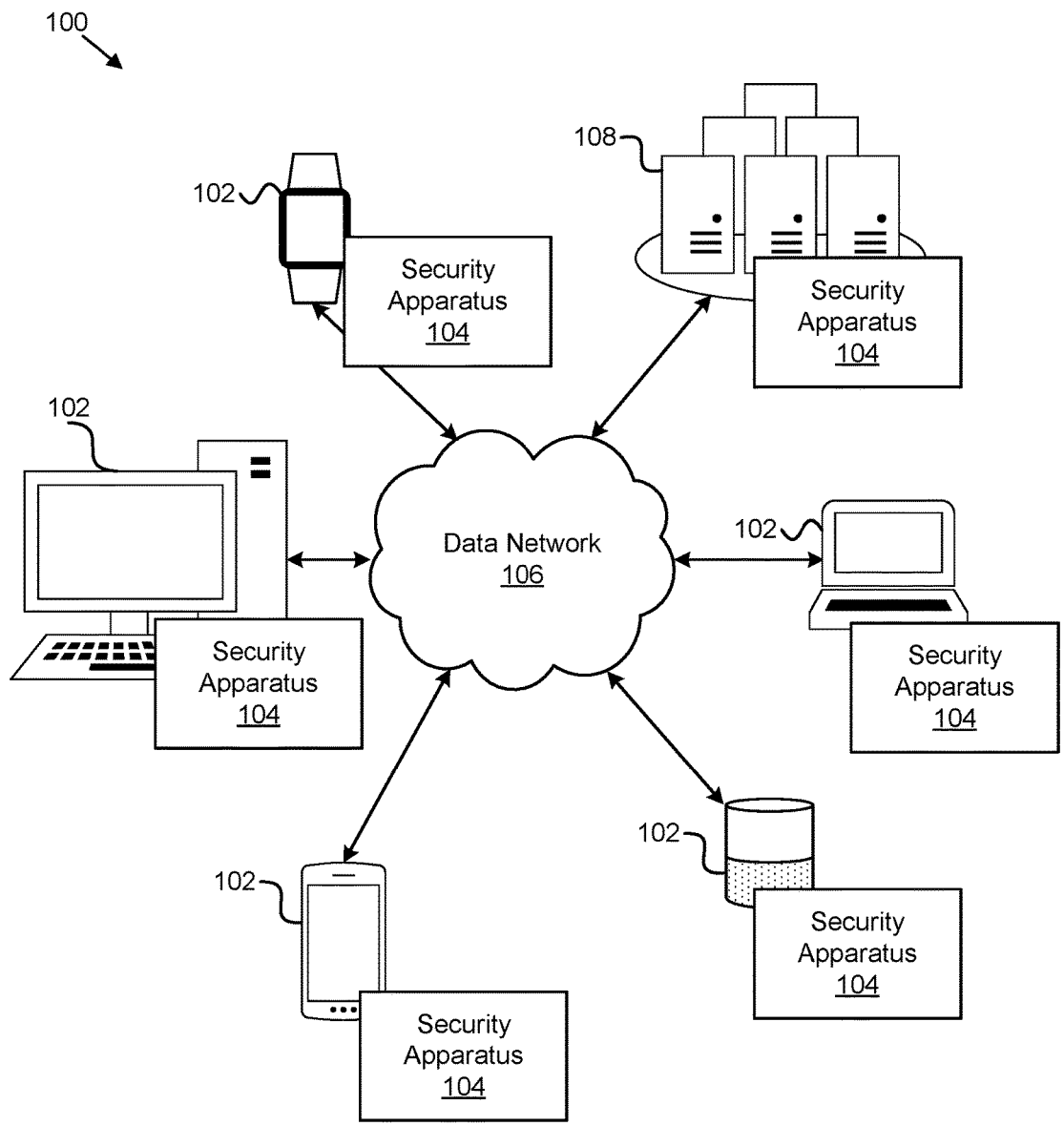
FIG. 1 is a schematic block diagram of a system for recipient-driven data encryption, according to one or more examples of the present disclosure.

FIG. 1 is a schematic block diagram illustrating one embodiment of a system 100 for recipient-driven data encryption. The system 100 includes one or more information handling devices 102, one or more security apparatuses 104, one or more data networks 106, and one or more servers 108. Even though a specific number of information handling devices 102, security apparatuses 104, data networks 106, and servers 108 are depicted in FIG. 1, one of skill in the art will recognize, in light of this disclosure, that any number of information handling devices 102, security apparatuses 104, data networks 106, and servers 108 may be included in the system 100.

The information handling devices 102 of the system 100 may include one or more of a desktop computer, a laptop computer, a tablet computer, a smart phone, a smart speaker (e.g., Amazon Echo, Google Home, Apple HomePod), a security system, a set-top box, a gaming console, a smart TV, a smart watch, a fitness band or other wearable activity tracking devices, an optical head-mounted display (e.g., a virtual reality headset, smart glasses, or the like), a High-Definition Multimedia Interface ("HDMI") or another electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

The one or more information handling devices 102 further include quantum computing devices that are configured to generate, transmit, and/or receive quantum data over quantum communication channels, e.g., data networks 106 that are designed to carry quantum information such as fiber optic networks for carrying photons. As used herein, quantum computing refers to systems that use quantum-mechanical phenomena, e.g., entanglement, to perform data operations using quantum bits, e.g., superpositions of states. In such an embodiment, the quantum data or quantum information that is generated and transmitted by the quantum computing devices comprises quantum bits (qubits) that represent atoms, ions, photons, electrons, or the like. As described herein, the quantum computing devices may be configured to generate quantum data (qubits) that are used for quantum cryptography such as quantum key distribution. For instance, a quantum computing device may transmit photons that have a number of states such that when a photon is measured, the measured state may be encoded as a portion of an encryption key, e.g., a one or a zero.

Thus, quantum key distribution, as used herein, enables two or more parties to produce a shared random secret key, e.g., a quantum encryption key, known only to them, which can be used to encrypt and decrypt data. In certain embodiments, quantum entanglement may be used to generate the same encryption keys at different devices without sharing cryptographic information between the devices. As used herein, quantum entanglement refers to the phenomena that pairs or groups of particles, e.g., photons, are generated or interact in ways such that the quantum state of each particle cannot be described independently of the others, even when the particles are separated by a large distance. Thus, when the state of an entangled photon is read at a first device, the state of the corresponding entangled photon can be determined at a second device at substantially the same time, which is illustrated in more detail below.

In some embodiments, an important and unique property of quantum key distribution is the ability of two communicating users to detect the presence of a third party attempting to gain knowledge of the key. This results from a fundamental aspect of quantum mechanics that the process of measuring a quantum system in general disturbs the system. In other words, a third party trying to eavesdrop on the key must in some way measure it, thus introducing detectable anomalies.

By using quantum entanglement, for instance, a system can be designed that detects eavesdropping, and if the level of eavesdropping is below a predetermined threshold, then a quantum encryption key can be generated that is determined to be secure. Otherwise, it can be determined that the quantum encryption key has been misappropriated, and the communication should be terminated. One of skill in the art, in light of this disclosure, will have an understanding of the mechanics of quantum computing and its applicability to data encryption.

In certain embodiments, the information handling devices 102, including the quantum computing devices, are communicatively coupled to one or more other information handling devices 102 and/or to one or more servers 108 over the data network 106, described below. The information handling devices 102 may include processors, processor cores, and/or the like that are configured to execute various programs, program code, applications, instructions, functions, and/or the like. The information handling devices 102 may include hardware and executable code, functions, instructions, operating systems, and/or the like for transmitting, receiving, and interpreting quantum information for data encryption.

In one embodiment, the security apparatus 104 is configured to detect, at a first device, that a second device is reading quantum information over a second quantum communication channel. The quantum information may be received from a quantum key device communicatively coupled to the second device over the second quantum communication channel. In further embodiments, the security apparatus 104 is configured to read, at the first device, quantum information over a first quantum communication channel responsive to detecting that the second device is reading the quantum information over the second quantum communication channel. The first device may be communicatively coupled to the quantum key device over the first quantum communication channel.

The security apparatus 104 of the system 100 generates a first quantum encryption key at the first device using the quantum information that was read at the first device from the first quantum communication channel, and encrypts data using the first quantum encryption key to create encrypted data. Furthermore, the security apparatus 104 transmits the encrypted data to a second device, where it may be decrypted using a second quantum encryption key that is generated at the second device using the quantum information that is read at the second device. In such an embodiment, the first quantum encryption key and the second quantum encryption key are the same. The security apparatus 104, including its various sub-modules, may be located on one or more information handling devices 102 and/or quantum computing devices in the system 100, one or more servers 108, one or more network devices, and/or the like. The security apparatus 104 is described in more detail below with reference to FIG. 2.

In one embodiment, the security apparatus 104 provides a solution over conventional encryption systems by, first, generating quantum encryption keys separately at the data sender and data recipient devices using quantum information received over quantum communication channels, which allows the data to be encrypted and decrypted without sharing the encryption key over standard communication protocols. Second, the first encryption key is generated at the sender device, e.g., the first device, in response to the recipient device, e.g., the second device, reading or measuring the quantum information transmitted to it over the second quantum communication channel, which causes the entangled particles to disentangle and trigger the first device to read the quantum information transmitted to it over the first quantum communication channel. Moreover, the security apparatus 104 may delete the quantum encryption keys after they are used to encrypt and decrypt the data so that the quantum encryption keys cannot be misappropriated.

In various embodiments, the security apparatus 104 may be embodied as a hardware appliance that can be installed or deployed on an information handling device 102, e.g., a quantum computing device, on a server 108, or elsewhere on the data network 106. In certain embodiments, the security apparatus 104 may include a hardware device such as a secure hardware dongle or other hardware appliance devices (e.g., a set-top box, a network appliance, or the like) that attaches to a device such as a quantum computing device, a laptop computer, a server 108, a tablet computer, a smart phone, a security system, or the like, either by a wired connection (e.g., a universal serial bus ("USB") connection) or a wireless connection (e.g., Bluetooth, Wi-Fi, near-field communication ("NFC"), or the like); that attaches to an electronic display device (e.g., a television or monitor using an HDMI port, a DisplayPort port, a Mini DisplayPort port, a Video Graphics Array ("VGA") port, a Digital Visual Interface ("DVI") port, or the like); and/or the like. A hardware appliance of the security apparatus 104 may include a power interface, a wired and/or wireless network interface, a graphical interface that attaches to a display, and/or a semiconductor integrated circuit device as described below, configured to perform the functions described herein with regard to the security apparatus 104.

The security apparatus 104 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the security apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security apparatus 104.

The semiconductor integrated circuit device or other hardware appliances of the security apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliances of the security apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth network, a near-field communication ("NFC") network, an ad hoc network, and/or the like. The data network 106 may include a wide area network ("WAN"), a storage area network ("SAN"), a local area network ("LAN"), an optical fiber network, the internet, or another digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The data network 106 may include components for transmitting quantum computing information that may include photons, ions, electrons, and/or the like. Various quantum networking components may include fiber optic links, few-space links, optical cavities, quantum repeaters, and/or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials ("ASTM"), the DASH7Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification ("IrPHY") as defined by the Infrared Data Association ("IrDA"). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, File Transfer Protocol ("FTP") servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

Figure 2:
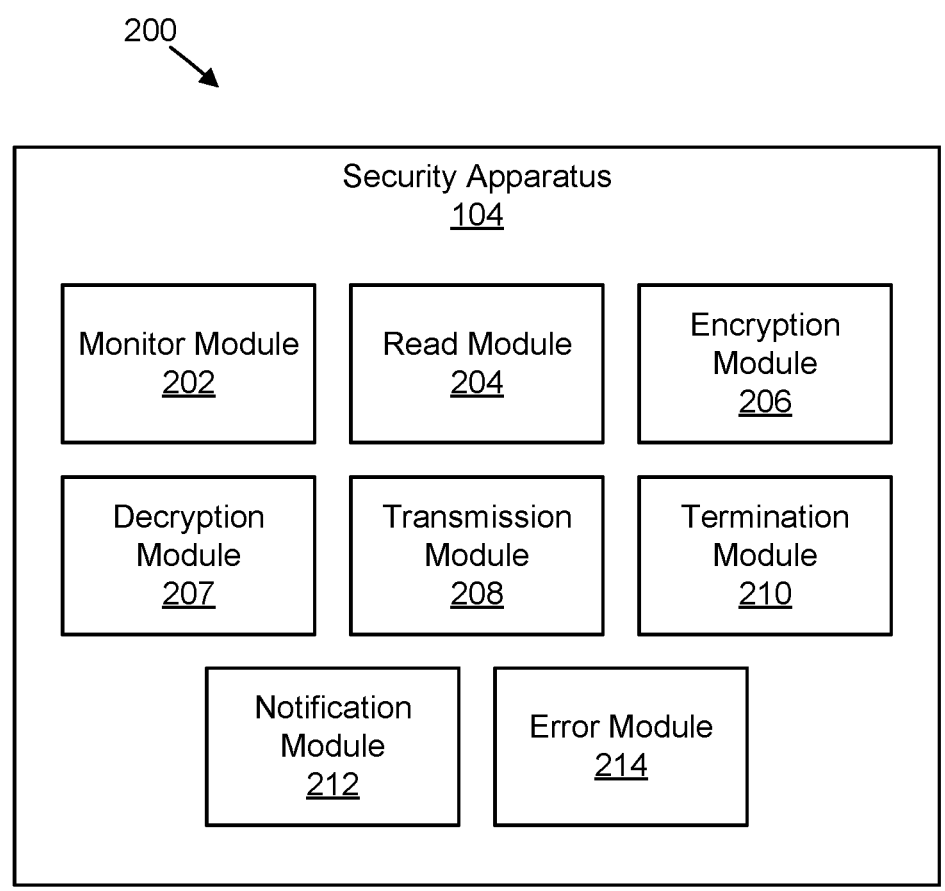
FIG. 2 is a schematic block diagram of an apparatus for recipient-driven data encryption, according to one or more examples of the present disclosure.

FIG. 2 depicts one embodiment of an apparatus 200 for recipient-driven data encryption. The apparatus 200 includes an embodiment of the security apparatus 104. The security apparatus 104, in certain implementations, includes one or more of a monitor module 202, a read module 204, an encryption module 206, a decryption module 207, a transmission module 208, a termination module 210, a notification module 212, and an error module 214, which are described in more detail below.

The monitor module 202, in one embodiment, is configured to detect, at a first device, e.g., a sender device, that a second device, e.g., a recipient device, is reading quantum information, e.g., entangled photons, over a second quantum communication channel. The quantum information may be transmitted to the second device over the second quantum communication channel from a quantum key device.

In one embodiment, the monitor module 202 compares at least a portion of the quantum information received at the first device over the first quantum communication channel and at the second device over the second quantum communication channel to determine whether the quantum information read at the first device correlates to the quantum information read at the second device. If the compared quantum information positively correlates, as would be the case with pairs of disentangled particles, then the monitor module 202 determines that the second device is reading quantum information over the second quantum communication channel. For instance, the monitor module 202 may periodically compare sets of quantum information received at the first device with corresponding sets of quantum information received at the second device to determine whether the sets of quantum information positively correlate, meaning that the state of a particle received at the first device corresponds to the state of a corresponding particle received at the second device.

The read module 204, in response to the monitor module 202 detecting that the second device is reading quantum information over the second quantum communication channel, is configured to read quantum information transmitted by the quantum key device over a first quantum communication channel communicatively coupled to the first device.

Thus, in certain embodiments, the first device and the second device are communicatively coupled to the same quantum key device and receive quantum information simultaneously and/or continuously from the quantum key device. For instance, the quantum key device may be located in the cloud, or another remote location, and is communicatively coupled to the first and second devices over quantum communication channels. The quantum key device may continuously transmits quantum information to the first and second devices, which may be used to generate encryption keys. In another embodiment, the quantum key device transmits quantum information on demand in response to a request from the first and/or second devices.

The quantum information comprises entangled particles, e.g., entangled photons, such that when the second device reads or measures the particles received at the second device over the second quantum communication channel, read module 204 reads or measures the corresponding particles received at the first device over the first quantum communication channel. For instance, the read module 204 may determine that photons transmitted over the first communication channel have been disentangled from their corresponding entangled photons transmitted to the second device over the second quantum communication channel, which may indicate that the second device is reading the quantum information transmitted over the second quantum communication channel. In such an embodiment, the read module 204 may buffer quantum information received over the first quantum communication channel so that qubits are not missed or skipped while the read module 204 determines that the second device is reading the quantum information.

In this manner, the same quantum encryption keys can be generated on the first and second devices without requiring the encryption key, or encryption key information, to be shared between the first and second devices. Furthermore, because the quantum encryption keys are generated dynamically when the second device is ready to receive encrypted data from the first device, new quantum encryption keys can be generated for each piece of data that is transmitted from the first device to the second device so that the quantum encryption keys are not reused.

The encryption module 206, in one embodiment, is configured to generate a first quantum encryption key at the first device using the quantum information that is read at the first device responsive to the second device reading the quantum information at the second device. The encryption module 206, in certain embodiments, is further configured to encrypt data at the first device that is intended for the second device using the first quantum encryption key to create encrypted data.

In such an embodiment, the encryption key at the second device creates the same quantum encryption key, e.g., a second quantum encryption key, at the second device. The decryption module 207, in certain embodiments, is configured to decrypt the encrypted data using the second quantum encryption key when the encrypted data is received at the second device. Because the quantum key device streams quantum information comprising entangled particles, when the read module 204 at the second device begins reading the quantum information, the monitor module 202 at the first device can detect that the particles have been disentangled and the read module 204 at the first device begins reading the quantum information that corresponds to the quantum information that is read at the second device. In such an embodiment, the read module 204 at the first device reads the quantum information until the read module 204 at the second device ceases reading the quantum information, which the monitor module 202 at the first device may detect by determining that the quantum information again comprises entangled particles instead of disentangled particles. In this manner, the same quantum encryption keys can be generated at the first and second devices.

The transmission module 208 transmits the encrypted data to the second device. In one embodiment, the transmission module 208 transmits the encrypted data to the second device over a standard communication channel that is separate from the quantum communication channels that are used to transmit the quantum information. The standard communication channel, for example, may include a standard network connection such as the Internet, an intranet, a local area network, a wide area network, and/or the like. Even if an eavesdropper were to intercept the encrypted data, the eavesdropper would not be able to decrypt the encrypted data because the encryption key or other key information was not sent with the encrypted data, prior to sending the encrypted data, or after the encrypted data was sent. The second device, e.g., the decryption module 207 located on the second device, however, can decrypt the encrypted data because the encryption module 206 at the second device has independently generated the second encryption key, which is the same as the first encryption key, at the second device using the quantum information that is received over the second quantum communication channel.

The termination module 210 is configured to prevent access to the first and second quantum encryption keys after the first and second encryption keys are used to encrypt and decrypt data on the first and second devices. In further embodiments, the termination module 210 prevents access to the first and second quantum encryption keys on the first and second devices by deleting the quantum encryption keys on the first and second devices, by marking the quantum encryption keys as deleted, but overwriting the quantum encryption keys on the first and second devices with different data, and/or the like. In certain embodiments, the termination module 210 (e.g., the code, functions, instructions, and/or the like that make up at least a portion of the termination module 210) may be stored in a trusted area of the second device, e.g., a trusted platform module or another similar secure area, so that the termination module 210 cannot be compromised by hackers or other unauthorized users that may attempt to steal the quantum encryption keys.

The notification module 212 is configured to notify the second device that data at the first device is waiting to be transmitted to the second device. For instance, the notification module 212 may send a signal, message, flag, and/or the like to the second device when data intended for the second device is queued and/or ready to be sent to the second device. In response to receiving the notification, the read module 204 at the second device may begin reading the quantum information from the second quantum communication channel, which the monitor module 202 at the first device may detect and cause the read module 204 at the first device to read the quantum information over the first quantum communication channel, the encryption module 206 at the first device to generate the first quantum encryption key and encrypt the queued data for transmission to the second device, and the transmission module 208 to transmit the encrypted data to the second device.

The error module 214 is configured to detect an error in the quantum information transmitted over one of the first and second quantum communication channels. As discussed above, detecting an error in the quantum information that is transmitted to the first and second devices may indicate that quantum information transmitted over one of the first and second quantum communication channels has been misappropriated. In other words, the error module 214 detects that an unauthorized third-party is eavesdropping on the quantum communication channel in an attempt to intercept the quantum encryption key.

In an embodiment where the quantum information comprises entangled particles, e.g., entangled photon particles, that are sent to both the first and second devices over the first and second quantum communication channels, respectively, the error module 214 detects when the quantum information is disturbed by an eavesdropper reading or measuring the quantum information prior to it reaching the first and/or second devices. In certain embodiments, the error module 214 compares portions of the quantum encryption keys received at the first and second devices to determine whether the quantum encryption keys match. If the error module 214 determines that the compared portions of the quantum encryption keys don't match, then it can be determined that an eavesdropper read or measured the quantum information in an attempt to intercept the quantum encryption key data over the first and/or second quantum communication channels. In such an embodiment, the error module 214 deletes the generated quantum encryption keys, and sends an error notification to alert users that an eavesdropper may be present in the system.

Figure 3:
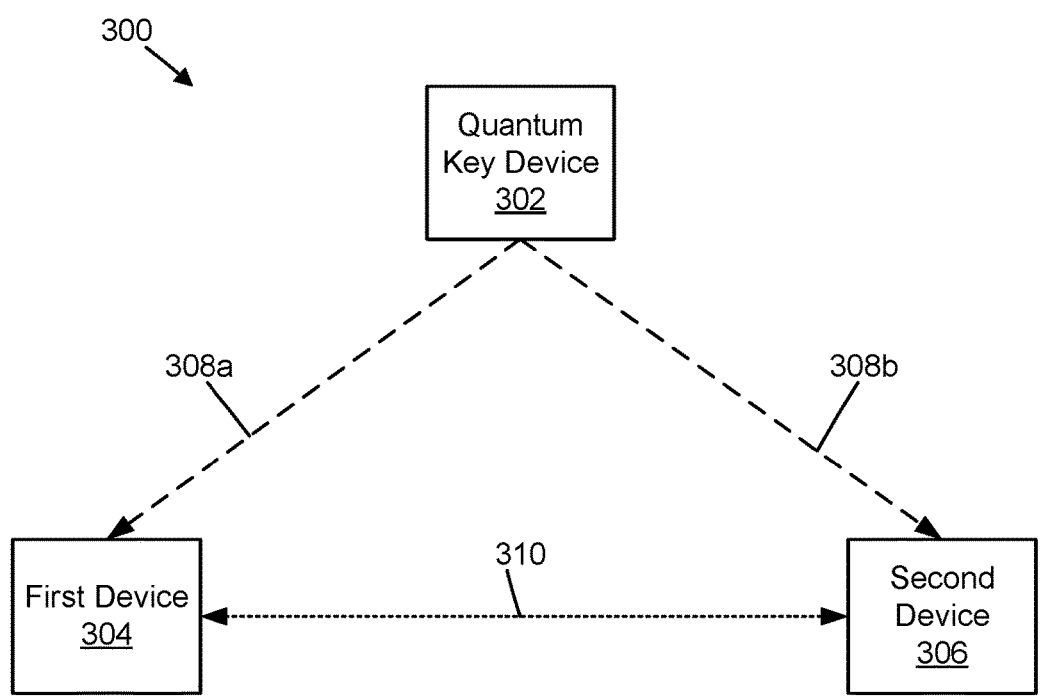
FIG. 3 is a schematic block diagram of a system for recipient-driven data encryption, according to one or more examples of the present disclosure.

FIG. 3 depicts one embodiment of a system 300 for recipient-driven data encryption. In one embodiment, the system 300 includes a quantum key device 302, a first device 304, and a second device 306. The quantum key device 302 is communicatively coupled to the first device 304 and the second device 306 over a first quantum communication channel 308a and a second quantum communication channel 308b, respectively. The first device 304 is communicatively coupled to the second device 306 over a conventional communication channel 310, such as the Internet or similar network connection. In one embodiment, the security apparatus 104, and/or the various modules 202-214 of the security apparatus 104, may be located on the quantum key device 302, the first device 304, the second device 306, and/or other servers 108 or other devices that may be connected to the system 300 (e.g., via a data network 106) to perform the various steps, functions, instructions, and/or the like of the system 300.

The monitor module 202 detects, at the first device 304, that the read module 204 at the second device 306 is reading quantum information over the second quantum communication channel 308b. In further embodiments, the read module 204 reads, at the first device 304, quantum information over the first quantum communication channel 308a responsive to detecting that the read module 204 at the second device 306 is reading the quantum information over the second quantum communication channel 308b.

The encryption module 206 at the first device 304 generates a first quantum encryption key at the first device 304 using the quantum information that is read over the first quantum communication channel 308a, and encrypts data using the first quantum encryption key. The transmission module 208, in one embodiment, transmits the encrypted data to the second device 306 over the standard or conventional communication channel 310. The decryption module 207 at the second device 306 may then decrypt the encrypted data using a second encryption key that the encryption module 206 generates at the second device 306 using quantum information that the read module 204 at the second module read over the second quantum communication channel 308b.

In this manner, the recipient, e.g., the second device 306, determines when it is ready to receive encrypted data from the sender, e.g., the first device 304, by reading quantum information that is transmitted over the second quantum communication channel 308b. The monitor module 202 at the first device 304 detects that the read module 204 at the second device 306 is reading the quantum information and the read module 204 at the first device simultaneously reads the corresponding quantum information at the first device 304 such that the same encryption keys can be generated at the first device 304 and second device 306 using the same quantum information transmitted by the quantum key device 302.

Figure 4:
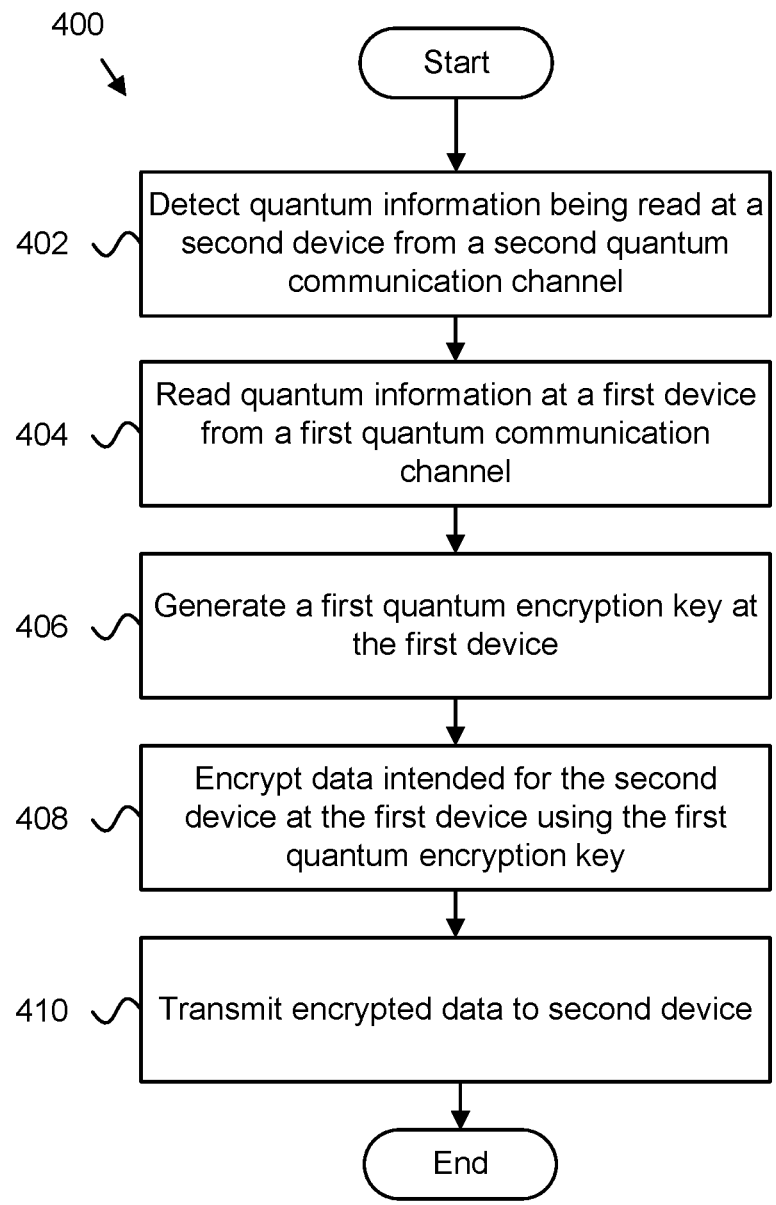
FIG. 4 is a schematic flow diagram of a method for recipient-driven data encryption, according to one or more examples of the present disclosure.

FIG. 4 is a schematic flow-chart diagram illustrating one embodiment of a method 400 for recipient-driven data encryption. The method 400 begins, and detects 402, at a first device, that a second device is reading quantum information over a second quantum communication channel. The quantum information may be received from a quantum key device that is communicatively coupled to the second device over the second quantum communication channel. The method 400 reads 404, at the first device, quantum information over a first quantum communication channel in response to detecting 402 that the second device is reading the quantum information over the second quantum communication channel. In certain embodiments, the first device is communicatively coupled to the quantum key device over the first quantum communication channel.

The method 400 generates 406 a first quantum encryption key, at the first device, using the quantum information that is read at the first device. The method 400 encrypts 408 data, at the first device, using the first quantum encryption key to create encrypted data. The method 400 transmits 410 the encrypted data to the second device. The second device decrypts the encrypted data using a second quantum encryption key that is generated at the second device using the quantum information that is read at the second device to create decrypted data. In certain embodiments, the first quantum encryption key is the same as the second quantum encryption key, and the method 400 ends. In certain embodiments, the monitor module 202, the read module 204, the encryption module 206, and the transmission module 208 perform the various steps of the method 400.

Figure 5:
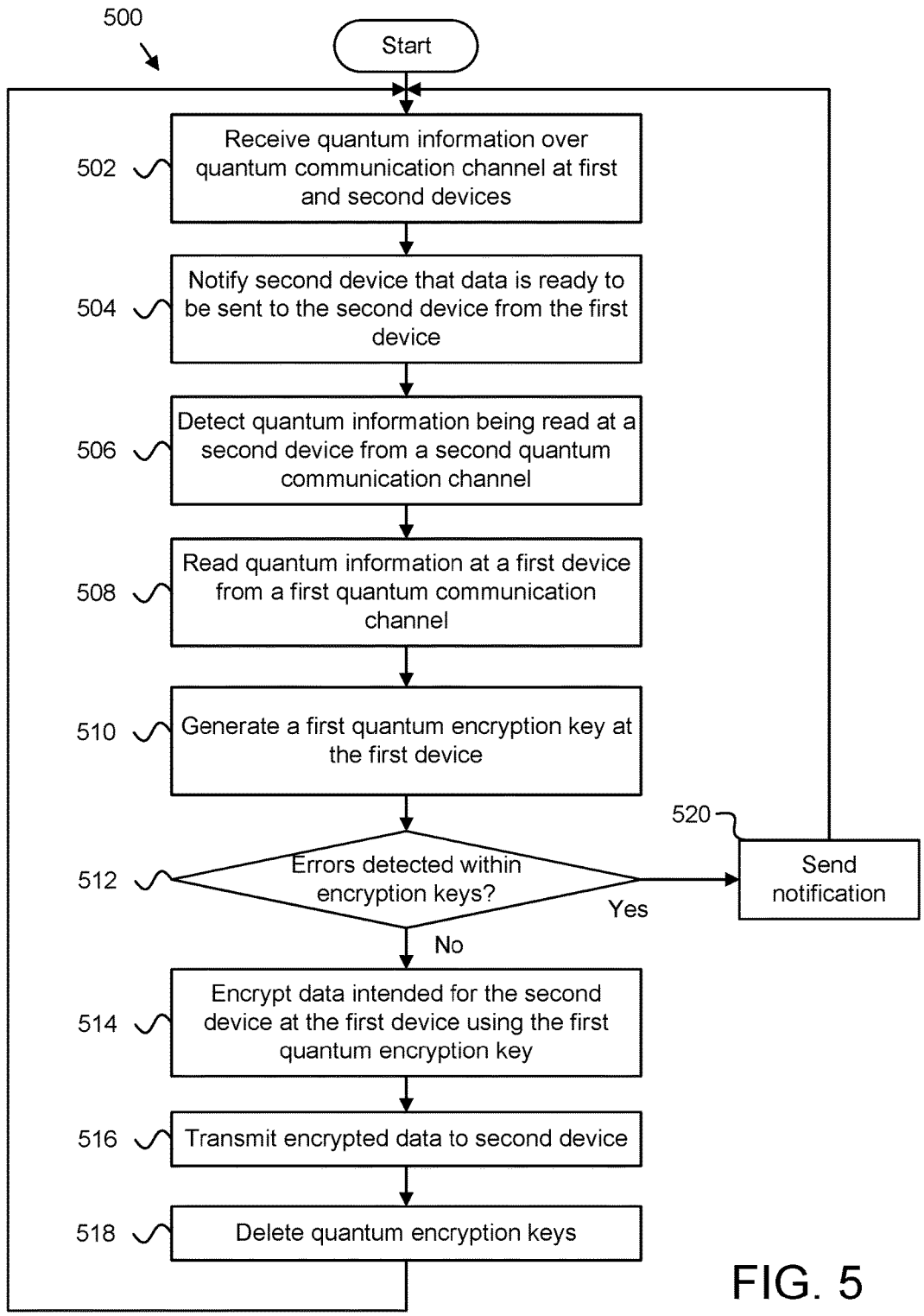
FIG. 5 is a schematic flow diagram of a method for recipient-driven data encryption, according to one or more examples of the present disclosure.

FIG. 5 is a schematic flow-chart diagram illustrating one embodiment of a method 500 for recipient-driven data encryption. The method 500 begins and receives 502 quantum information, e.g., entangled photons, over first and second quantum communication channels simultaneously at first and second devices. The method 500 notifies 504 the second device that data is ready to be sent to the second device from the first device.

The method 500 further detects 506, at a first device, that a second device is reading quantum information over a second quantum communication channel. The method 500 also reads 508, at the first device, quantum information over a first quantum communication channel in response to detecting 506 that the second device is reading the quantum information over the second quantum communication channel.

The method 500 additionally generates 510 a first encryption key at the first device that corresponds to, or is the same as, a second encryption key that is generated at the second device. The method 500 also determines 512 whether there are errors in the first and second encryption keys. For instance, portions of the first and second encryption keys may be compared to determine whether the portions correspond to each other. If errors are present, the method 500 may determine that an eavesdropper has attempted to intercept the encryption key information, e.g., the quantum information transmitted over the first and/or second quantum communication channels. In such an embodiment, the method 500 sends 520 a notification that there are errors in the first and second encryption keys and that the first and second encryption keys should be discarded, and the method 500 continues to receive 502 quantum information from the quantum key device for encrypting and decrypting new data.

Otherwise, the method 500 encrypts 514 data that is intended for the second device at the first device using the first quantum encryption key. The method 500 additionally transmits 516 the encrypted data to the second device, where it can be decrypted using the second quantum encryption key. The method 500 further deletes 518 the first quantum encryption key from the first device and the second quantum encryption key from the second device, and the method 500 continues to receive 502 quantum information from the quantum key device for encrypting and decrypting new data. In certain embodiments, the monitor module 202, the read module 204, the encryption module 206, the transmission module 208, the termination module 210, the notification module 212, and the error module 214 perform the various steps of the method 500.

Figure 6:
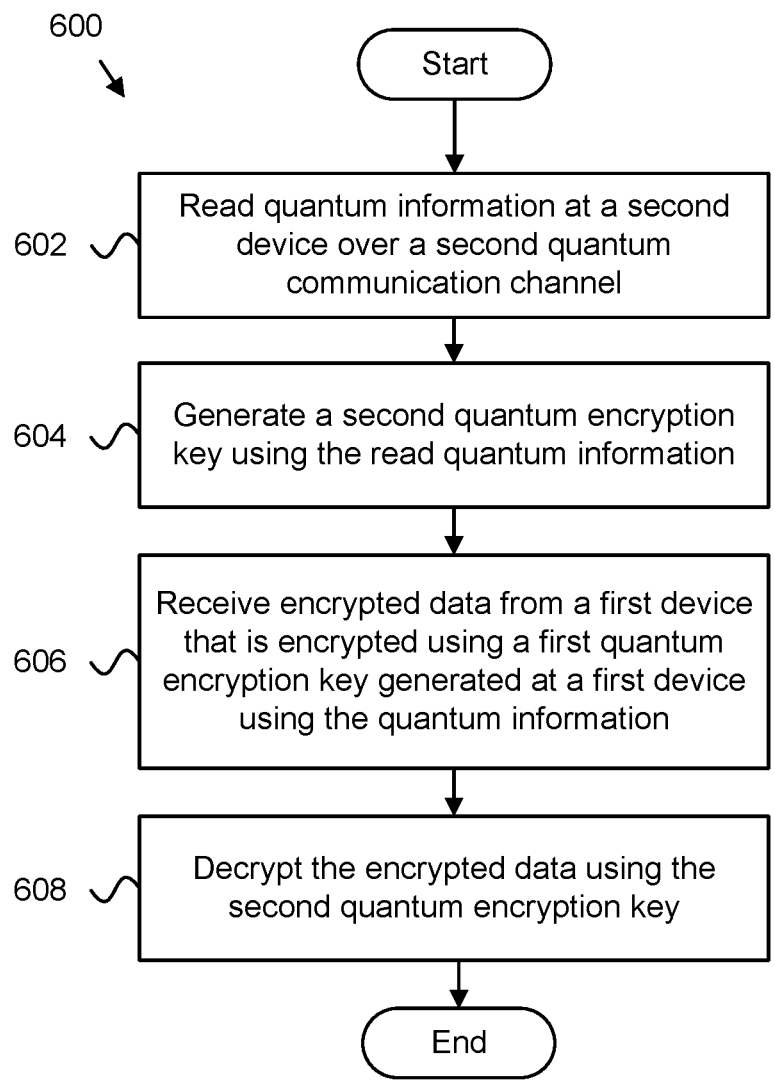
FIG. 6 is a schematic flow diagram of a method for recipient-driven data encryption, according to one or more examples of the present disclosure.

FIG. 6 is a schematic flow-chart diagram illustrating one embodiment of a method 600 for recipient-driven data encryption. The method 600 begins and reads 602 quantum information at a second device over a second quantum communication channel. The method 600 generates 604 a second quantum encryption key using quantum information that is read over the second quantum communication channel.

The method 600 receives 606 encrypted data from a first device. The encrypted data may be encrypted using a first quantum encryption key that is generated at a first device using the quantum information such that the first quantum encryption key at the first device is the same as the second quantum encryption key at the second device. The method 600 decrypts 608 the encrypted data using the second quantum encryption key, and the method 600 ends. In one embodiment, the read module 204, the encryption module 206, and the decryption module 207 may perform the various steps of the method 600.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in code and/or software, the code and/or software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system, comprising:
   a quantum key device configured to generate quantum information and transmit the quantum information over a first quantum communication channel and a second quantum communication channel;
   a first device communicatively coupled to the quantum key device over the first quantum communication channel;
   a second device communicatively coupled to the quantum key device over the second quantum communication channel;
   a monitor module configured to detect, at the first device, that the second device is reading the quantum information over the second quantum communication channel;
   a read module configured to read, at the first device, the quantum information over the first quantum communication channel responsive to detecting that the second device is reading the quantum information over the second quantum communication channel;
   an encryption module at the first device configured to:
   generate a first quantum encryption key using the generated quantum information that is read over the first quantum communication channel; and
   encrypt data using the first quantum encryption key to create encrypted data; and
   a transmission module at the first device configured to transmit the encrypted data to the second device, the second device decrypting the encrypted data to create decrypted data using a second quantum encryption key generated at the second device using the generated quantum information read at the second device, wherein the first quantum encryption key being the same as the second quantum encryption key,
   wherein at least a portion of the modules comprise one or more of a hardware circuit, a programmable hardware device, or executable code, the executable code stored on one or more computer readable storage media.

2. The system according to claim 1, wherein the quantum information comprises a stream of entangled quantum particles such that when a state of a quantum particle of an entangled set of quantum particles is read, corresponding states of other quantum particles in the entangled set of quantum particles are determinable.

3. The system according to claim 2, wherein the monitor module is further configured to detect that the second device is reading the quantum information over the second quantum communication channel by detecting, at the first device, that the quantum particles of the quantum information transmitted over the first quantum communication channel are disentangled from corresponding quantum particles read at the second device over the second quantum communication channel.

4. The system according to claim 3, wherein the monitor module compares at least a portion of quantum information received at the first device over the first quantum communication channel and at the second device over the second quantum communication channel to determine whether the quantum information read at the first device correlates to the quantum information read at the second device, a positive correlation indicating that the second device is reading quantum information over the second quantum communication channel.

5. The system according to claim 1, wherein the quantum key device continuously sends quantum information over the first and second quantum communication channels, the first and second devices reading quantum information from the first and second quantum communication channels each time a quantum encryption key is generated.

6. The system according to claim 1, wherein the read module reads quantum information read over the first quantum communication channel until the second device stops reading corresponding quantum information over the second quantum communication channel.

7. The system according to claim 1, wherein the transmission module transmits the encrypted data over a standard communication channel that is separate from the first and second quantum communication channels.

8. The system according to claim 1, wherein the encryption module generates a new first quantum encryption key derived from the quantum information transmitted over the first quantum communication channel for each new data intended for the second device.

9. The system according to claim 1, further comprising a termination module configured to prevent access to the first and second quantum encryption keys after the first and second quantum encryption keys are used to encrypt and decrypt the data on the first and second devices, respectively, the termination module preventing access by one of:
  deleting the first and second quantum encryption keys; or
  overwriting the first and second quantum encryption keys.

10. The system according to claim 1, further comprising a notification module configured to notify the second device that data at the first device is waiting to be transmitted to the second device.

11. The system according to claim 1, further comprising an error module configured to detect an error in the quantum information transmitted over one of the first and second quantum communication channels, the error indicating that quantum information transmitted over one of the first and second quantum communication channels has been misappropriated.

12. The system according to claim 11, wherein the error module detects an error in the quantum information received at one of the first and second devices over the first and second quantum communication channels by comparing at least a portion of the first and second quantum encryption keys.

13. An apparatus, comprising:
  a monitor module configured to detect, at a first device, that a second device is reading quantum information over a second quantum communication channel, the quantum information received from a quantum key device communicatively coupled to the second device over the second quantum communication channel;
  a read module configured to read, at the first device, quantum information over a first quantum communication channel responsive to detecting that the second device is reading the quantum information over the second quantum communication channel, the first device communicatively coupled to the quantum key device over the first quantum communication channel; an
  encryption module at the first device configured to:
    generate a first quantum encryption key using the generated quantum information that is read over the first quantum communication channel; and
    encrypt data using the first quantum encryption key to create encrypted data; and
  a transmission module at the first device configured to transmit the encrypted data to the second device, the second device decrypting the encrypted data to create decrypted data using a second quantum encryption key generated at the second device using the generated quantum information read at the second device, wherein the first quantum encryption key being the same as the second quantum encryption key.

14. The apparatus according to claim 13, wherein the quantum information comprises a stream of entangled quantum particles such that when a state of a quantum particle of an entangled set of quantum particles is read, corresponding states of other quantum particles in the entangled set of quantum particles are determinable.

15. The apparatus according to claim 14, wherein the monitor module is further configured to detect that the second device is reading the quantum information over the second quantum communication channel by detecting, at the first device, that the quantum particles of the quantum information transmitted over the first quantum communication channel are disentangled from corresponding quantum particles read at the second device over the second quantum communication channel.

16. The apparatus according to claim 15, wherein the monitor module compares at least a portion of quantum information received at the first device over the first quantum communication channel and at the second device over the second quantum communication channel to determine whether the quantum information read at the first device correlates to the quantum information read at the second device, a positive correlation indicating that the second device is reading quantum information over the second quantum communication channel.

17. The apparatus according to claim 13, wherein the quantum key device continuously sends quantum information over the first and second quantum communication channels, the first and second devices reading quantum information from the first and second quantum communication channels each time a quantum encryption key is generated.

18. The apparatus according to claim 13, wherein the read module reads quantum information read over the first quantum communication channel until the second device stops reading corresponding quantum information over the second quantum communication channel.

19. The apparatus according to claim 13, further comprising a termination module configured to prevent access to the first and second quantum encryption keys after the first and second quantum encryption keys are used to encrypt and decrypt the data on the first and second devices, respectively, the termination module preventing access by one of:
   deleting the first and second quantum encryption keys; or
   overwriting the first and second quantum encryption keys.

20. A method, comprising:
   detecting, at a first device, that a second device is reading quantum information over a second quantum communication channel, the quantum information received from a quantum key device communicatively coupled to the second device over the second quantum communication channel;
   reading, at the first device, quantum information over a first quantum communication channel responsive to detecting that the second device is reading the quantum information over the second quantum communication channel, the first device communicatively coupled to the quantum key device over the first quantum communication channel;
   generating a first quantum encryption key at the first device using the generated quantum information that is read over the first quantum communication channel;
   encrypting data at the first device using the first quantum encryption key to create encrypted data; and
   transmitting from the first device the encrypted data to the second device, the second device decrypting the encrypted data to create decrypted data using a second quantum encryption key generated at the second device using the generated quantum information read at the second device, wherein the first quantum encryption key being the same as the second quantum encryption key.

* * * * *